United States Patent
Suda et al.

(10) Patent No.: US 6,226,999 B1
(45) Date of Patent: May 8, 2001

(54) AUTOMOBILE AIR CONDITIONER

(75) Inventors: Hiroyuki Suda; Akiyo Tsurushima, both of Tokyo (JP)

(73) Assignee: Calsonic Kansei Corporation, Tokyo (JP)

(*) Notice: Subject to any disclaimer, the term of this patent is extended or adjusted under 35 U.S.C. 154(b) by 0 days.

(21) Appl. No.: 09/522,896

(22) Filed: Mar. 10, 2000

(30) Foreign Application Priority Data

Mar. 29, 1999 (JP) .................................................. 11-085745

(51) Int. Cl.⁷ ...................................................... B60H 1/32
(52) U.S. Cl. .................................. 62/244; 62/298; 62/317
(58) Field of Search .......................... 165/42, 43; 62/244, 62/298, 317

(56) References Cited

U.S. PATENT DOCUMENTS

| | | | |
|---|---|---|---|
| 4,407,354 | * 10/1983 | Takishita et al. | 165/42 |
| 5,408,841 | * 4/1995 | Fujiwara et al. | 62/192 |
| 6,138,749 | * 10/2000 | Kawai et al. | 165/42 |

* cited by examiner

Primary Examiner—Ronald Capossela
Assistant Examiner—Mohammad M Ali
(74) Attorney, Agent, or Firm—Foley & Lardner

(57) ABSTRACT

An evaporator is placed on an insulator, and the insulator, together with the evaporator, is made to easily be withdrawn out of a cooling case. Upper and lower edge portions of an air filter are freely guided and supported by a guide portion provided on an upper surface of the insulator and an upper guide portion provided on a lower surface of a top plate portion of the cooling case.

8 Claims, 3 Drawing Sheets

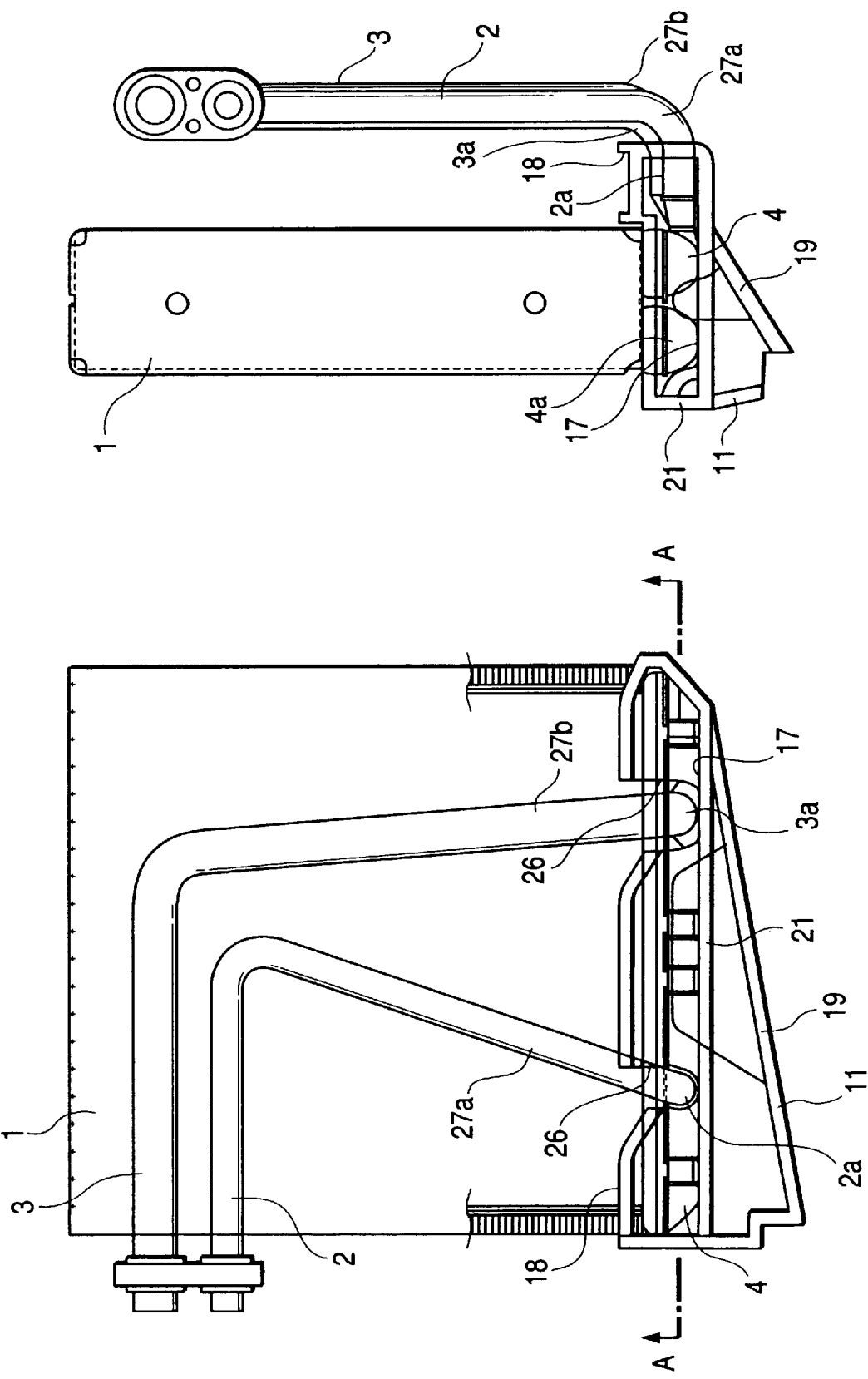

AUTOMOBILE AIR CONDITIONER

BACKGROUND OF THE INVENTION

1. Field of the Invention

The present invention relates to an improved automobile air conditioner for air-conditioning the interior of the passenger compartment of an automobile, and an object thereof is to improve the layout of an air filter for cleaning air for use in air-conditioning and workability in replacing air filters.

The present application is based on Japanese Patent Applications No. Hei. 11-85745, which is incorporated herein by reference.

2. Description of the Related Art

As known, an automobile air conditioner comprises a blower unit, a cooling unit and a heater unit that are disposed in series to each other with respect to a flow of air for use in air-conditioning. Among them, the blower unit disposed at an upstream end of the air flow incorporates a fan in a blower case and functions to send air taken thereinto from the outside or inside of a vehicle compartment for use in air-conditioning to a downstream side of the air flow. The cooling unit disposed at an intermediate portion of the air flow incorporates therein an evaporator for cooling the air so sent thereto. In recent years, an air filter is disposed on an upstream side of the evaporator for trapping thereat foreign matters such as pollen contained in the air taken for use in air-conditioning. The heater unit disposed at a downstream side of the air flow incorporates therein a heater core for heating the air. A bypass flow path is provided on one side of the heater unit, and an air mixing door is provided upstream of these heater core and bypass flow path.

In air-conditioning the inside of a passenger compartment of an automobile with an automobile air conditioner constructed as described above, the fan is operated, and a refrigerant and hot water are allowed to flow through the evaporator and the heater core, respectively. The temperature of air taken in for use for air-conditioning is reduced and water vapor contained in the air is removed when it is allowed to pass through the evaporator (in a case where a refrigerant is allowed to flow through the evaporator), and the air so cooled and dried is then sent into the heater unit. In the heater unit, the air is allowed to pass through one or both of the heater core and bypass flow path so as to be adjusted at a desired temperature in accordance with a position of the air mixing door, and the air whose temperature is so adjusted is then blown into the automobile passenger compartment.

In recent years, there is a tendency to attempt to improve the efficiency in assembling of automobiles by integrating constituent units of an automobile air conditioner into one body. In other words, conventionally, a blower unit, a cooling unit and a heater unit are first constructed as a separate unit, respectively, and afterwards they are combined together. Recently, however, in contrast to this conventional method, there is a growing tendency to integrate the whole or part of the respective constituent units (for instance, the blower unit and the cooling unit) into one body with a view to omitting or simplifying the unit combining work. On the other hand, the respective constituent members of the automobile air conditioner need to be constructed so as to be disassembled when there is caused a failure thereof. In addition, air filters need to be replaced periodically, and therefore they are constructed so as to easily be mounted and dismounted to facilitate the replacement work. With a view to satisfying such a requirement, there is described and known in Japanese Patent Publication No. Hei. 10-181341 a conventional construction for facilitating the replacement of air filters.

However, in a case where the respective constituent units are integrated into one body, if there is a failure of a constituent component, it is difficult to dismount only the unit incorporating therein the failed component. For instance, in trying to do repair or replacement of an evaporator constituting the cooling unit, since it is not possible to remove only the cooling unit, cost involved in the repair or replacement of the failed evaporator would be increased. Or, in trying to retrofit an evaporator to an automobile heater which is not fitted with an evaporator, the retrofitting of the evaporator becomes difficult. To cope with this, it has been conceived to form an opening in a side of a case constituting the cooling unit so that only the evaporator can freely be removed from or installed in the cooling unit case through the opening so formed.

In a case, however, where a construction as described above is adopted, depending on the configuration of piping attached to the evaporator, it becomes difficult to dispose an air filter on the upstream side of the evaporator without any modification. In other words, a downstream end of a feed pipe for feeding a refrigerant into the evaporator and an upstream end of a withdrawal pipe for withdrawing the refrigerant from the evaporator are respectively connected to the evaporator. In a case where those end portions of the two pipes are connected to the evaporator at end portions in a width direction thereof, these two pipes do not disturb the disposition of the air filter. However, an evaporator provided with the aforesaid piping is not common currently. In contrast to this, in piping commonly used on the evaporator, pipes are connected to a side of a tank constituting the evaporator at an intermediate portion thereof and the pipes so connected are disposed upstream of the evaporator 1. With this construction, without any modification in the piping, the pipes so disposed interfere with the air filter and therefore it is not possible to dispose the air filter at a position immediately in front of the evaporator on the upstream side thereof. If the air filter is disposed far away from the evaporator, the air filter can be disposed at the aforesaid position. This would, however, increase a longitudinal dimension of the cooling unit along a direction in which air for use in air-conditioning is caused to flow, and hence leads to an enlargement of the automobile air conditioner, which is undesirable.

SUMMARY OF THE INVENTION

The present invention was made in view of the aforesaid circumstances.

As with the conventional automobile air conditioner, an automobile air conditioner according to the present invention comprises a blower unit provided at an upstream end of a flow of air for use in air-conditioning and having incorporated therein a fan for taking air for use in air-conditioning into the blower unit and sending the air to a downstream side of the air flow, a cooling unit provided at an intermediate portion of the air flow and having incorporated therein an air filter for trapping thereat foreign matters in the air and an evaporator for cooling the air, and a heater unit provided at a downstream end of the air flow and having incorporated therein a heater core for heating the air, and those blower unit, cooling unit and heater unit are provided in series to each other with respect to the direction of the air flow.

In particular, in the automobile air conditioner according to the present invention, a cooling case accommodating therein the cooling unit comprises a main body adapted to freely accommodate the air filter and the evaporator and having an opening formed in one side thereof and a lid adapted to detachably be mounted on the main body for closing the opening so formed in said one side thereof. Along with this, an insulator holding the evaporator on an upper or lower surface thereof is adapted to freely be drawn from the opening formed in the one side of the main body together with the evaporator. Moreover, a guide portion is provided on the upper or lower surface of the insulator for guiding a lower edge portion of the air filter. In addition, the air insulator does not necessarily have to be withdrawn from the main body in a non-destroyed condition. The insulator may be constructed so as to easily be withdrawn from the main body even if it is partially destroyed when so withdrawn.

According to the automobile air conditioner constructed as described above, the evaporator and the air filter can be disposed close to each other, and the interference between the air filter and the evaporator can also be prevented. In addition, in replacing the air filter, only the air filter to be replaced has to be slid relative to the guide portion with the insulator being left inside the cooling case, whereby replacement work can easily be attained. Furthermore, in repairing or replacing the evaporator, the whole of the insulator including the air filter and the evaporator can be withdrawn from the cooling case, whereby needed repairing or replacing work can be attained.

Features and advantages of the invention will be evident from the following detailed description of the preferred embodiments described in conjunction with the attached drawings.

BRIEF DESCRIPTION OF THE DRAWINGS

In the accompanying drawings:

FIG. 2 shows a perspective diagram of an evaporator and an insulator as seen from an upstream side of an air flow;

FIG. 3 shows a view seen from the left-hand side of FIG. 2; and

DETAILED DESCRIPTION OF THE PREFERRED EMBODIMENTS

Figure 1:
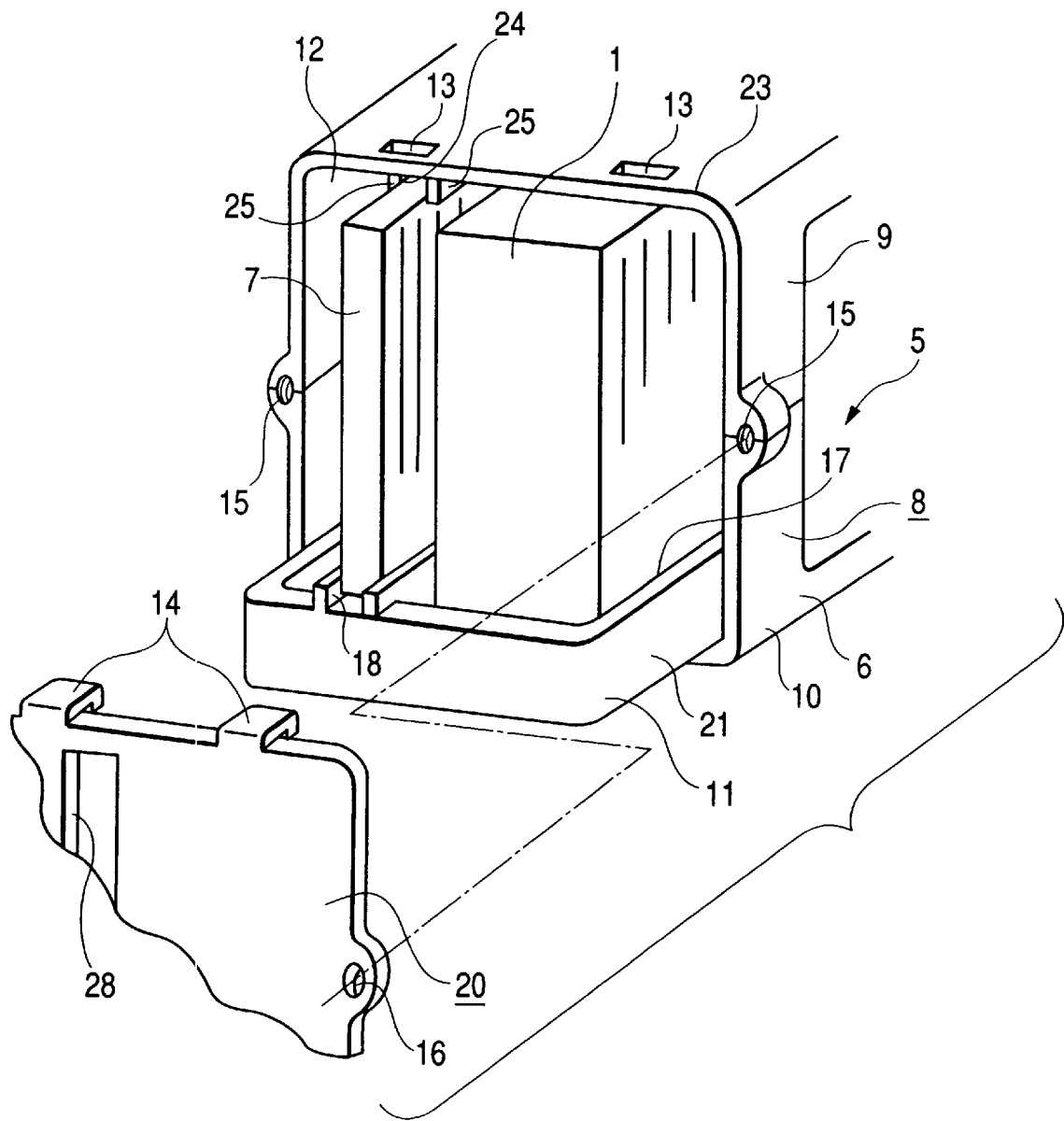
FIG. 1 shows a perspective view of a main part of an embodiment according to a mode of carrying out the present invention, showing a state in which an insulator is withdrawn from a cooling case.
Figure 4:
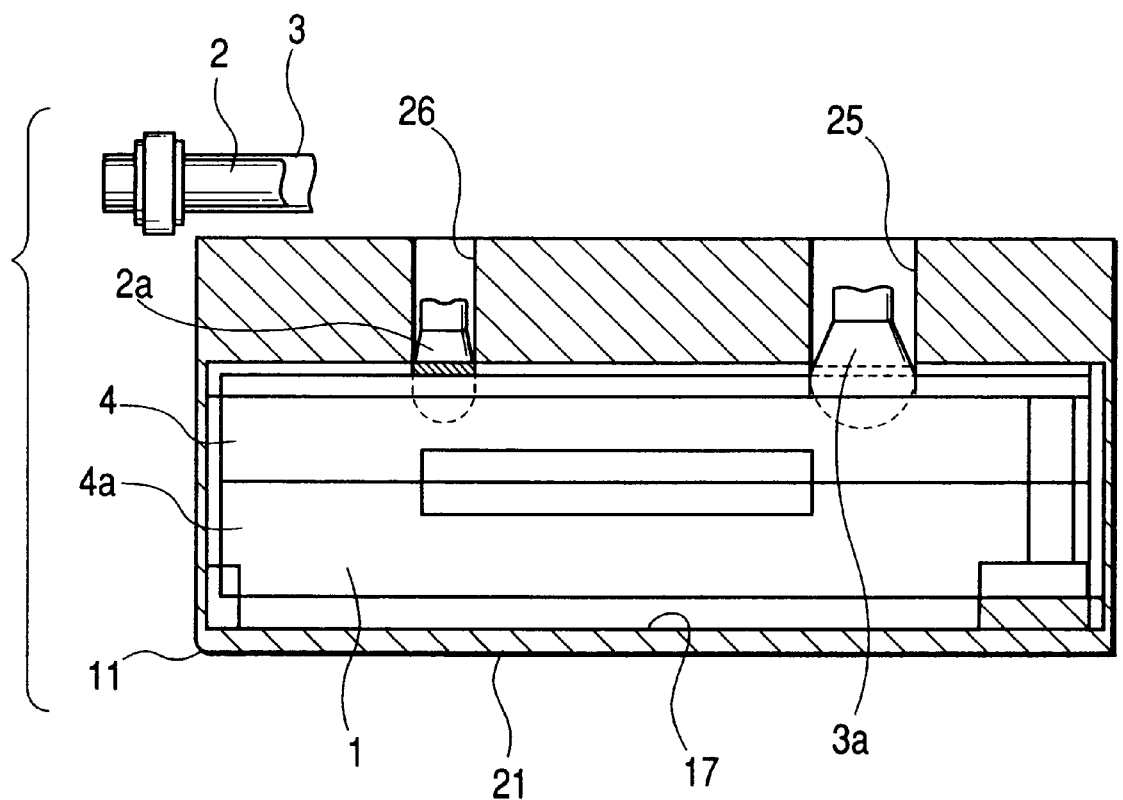
FIG. 4 shows a cross-sectional view taken along the line A—A of FIG. 2.

FIGS. 1 to 4 illustrate an embodiment according to a mode of carrying out the present invention. The automobile air conditioner of the present invention comprises a cooling unit 5 as shown in FIG. 1 that is interposed between a blower unit, not shown, that is provided at an upstream end of air for use in air-conditioning and a heater unit, not shown, that is provided at a downstream end of the air flow. The feature of the present invention resides in this cooling unit 5. Since the construction and operation of those blower unit and the heater unit are conventionally known and they have nothing to do with the gist of the present invention, drawings and descriptions thereof will be omitted. Thus, the present invention will be described below, concentrating on features thereof.

A cooling case 6 accommodating therein the cooling unit 5 comprises a main body 8 adapted to accommodate therein an air filter 7 and an evaporator 1 and having an opening formed in one side thereof, and a lid 20 adapted to detachably be mounted on the main body 8 for closing the opening form in the side of the main body 8. These main body 8 and the lid 20 are both injection molded from a synthetic resin. Of these two constituent members, the main body 8 comprises an upper half piece 9 and a lower half piece 10 which are constructed so as to be combined together to form a hollow box configuration with abutting portions thereof being adhered or riveted to each other. A side opening 12 is formed in one side of the main body 8 so constructed so that an insulator 11 having the air filter 7 and the evaporator 1 placed on an upper surface thereof can be withdrawn from the main body 8 together with the air filter 7 and the evaporator 1.

Locking holes 13, 13 are formed in an upper surface of the main body 8 at positions located directly above the side opening 12 and hook-like locking pieces 14, 14 are provided at an upper edge of the lid 20 so as to releasably be locked in the locking holes 13, 13. In addition, screw holes 15, 15 are formed in sides of the main body 8 at positions located at sides of the side opening 12. These respective screw holes 15, 15 are each formed by insert molding a nut piece in part of the main body 8 when the main body 8 is injection molded from a synthetic resin. On the other hand, through holes 16 are formed in the lid 20 at portions aligning with the respective screw holes 15, 15. When the side opening 12 is closed with the lid 20, the locking pieces 14 are locked in the locking holes 13, 13, respectively, and the screw holes 15, 15 and the through holes 16 are aligned with each other. Then, screws, not shown, are threadingly fitted into the respective screw holes 15, 15 and tightly screwed in. Moreover, in the illustrated embodiment, a rectangular through hole 28 is formed in the lid 20 at a portion confronting an end face of the air filter 7 in a width direction thereof so that the air filter 7 is allowed to freely pass therethrough, and this through hole 28 can be closed with an auxiliary lid, not shown.

The insulator 11 is overall formed of a heat insulator such as expanded polystyrene, and provided on the upper surface thereof are an evaporator accommodating portion 17 for accommodating therein a pair of tanks 4, 4a provided at a lower end portion of the evaporator 1 without looseness and a guide portion 18 for guiding a lower edge portion of the evaporator 1. Of these two, since it has to accommodate the pair of tanks 4, 4a without looseness, the evaporator accommodating portion 17 is provided with a rectangular shape when viewed from the top. In addition, this evaporator accommodating portion 17 functions as a water receiver for receiving condensate sticking to and then flowing down thereinto along the surfaces of the evaporator 1 and draining the condensate so received to the outside.

To make this happen, a bottom of the evaporator accommodating portion 17 is inclined in one direction so that condensate sticking to and then flowing down along the evaporator 1 to the bottom can be drained to the outside. To this end, in the illustrated embodiment, the bottom of the insulator 11 itself is inclined, and a bottom plate portion of the cooling case 6 for accommodating the insulator 11 is also inclined so as to match the inclined bottom of the insulator 11. Therefore, in the illustrated embodiment, in a state in which the evaporator 1 and the air filter 7 are placed on the insulator 11, an inclined projection 19 provided on the bottom of the insulator 11 and a depression formed in the bottom of the cooling case 6 are in engagement with each other, and therefore it is not possible to withdraw the whole of the insulator 11 from the cooling case 6 without breaking the same. However, this does not constitute a cause for prevention of the enforcement of the present invention. A detailed description will be made with respect to this later.

The guide portion 18 for guiding and supporting the lower edge portion of the air filter 7 is provided on the upper surface of the insulator 11 at a position slightly upstream of the evaporator accommodating portion 17 with respect to a flow of air for use in air-conditioning (the left-hand side of the evaporator accommodating portion 17 in FIG. 1, and the right-hand side of the same in FIG. 3). In the illustrated embodiment, the guide portion 18 is formed into a U-shaped groove having a width or a gap substantially equal to the thickness of the lower edge portion of the air filter 7. Provided on a lower surface of a top plate 23 of the upper half piece 9 constituting the cooling case 6 is an upper guide portion 24 for guiding and supporting an upper edge portion of the air filter 7. In the illustrated embodiment, this upper guide portion 24 is formed into a U-shaped groove between a pair of elongated projections 25, 25 which are formed at an interval meeting the thickness of the upper edge portion of the air filter 7.

Furthermore, notched portions 26, 26 are formed in the insulator 11 at portions corresponding to a feed pipe 2 and a withdrawal pipe 3 attached to the evaporator 1 for allowing base portions 2a, 3a of these pipes 2, 3 to pass therethrough. The continuity of the guide portion 18 is interrupted by those two notched portions 26, 26. In addition, rising portions 27a, 27b of the two pipes 2, 3 are situated on a side of the guide portion 18 which is opposite to a side thereof facing the evaporator 1. In other words, the air filter 7 is interposed between a main body of the evaporator 1 and the two rising portions 27a, 27b with the upper and lower edge portions thereof being supported by the guide portion 18 and the upper guide portion 24, respectively.

According to the automobile air conditioner constructed as described heretofore, the evaporator 1 and the air filter 7 can be disposed close to each other, and moreover, the interference between the air filter 7 and the pipes attached to the evaporator 1 can be prevented. That is to say, the air filter 7 is disposed above the base portions 2a, 3a of the two pipes 2, 3, so that the air filter 7 is interposed between the rising portions 27a, 27b of the two pipes 2, 3 and the main body of the evaporator 1, thereby making it possible to prevent an increase in longitudinal dimension of the cooling unit 5 with respect to a flow of air for use in air-conditioning that would be entailed by the provision of the air filter 7.

In addition, in the event that the air filter 7 is replaced, only the air filter 7 is slid relative to the guide portion 18 and the upper guide portion 24 with the insulator 11 being left inside the cooling case 6, whereby replacement work can easily be completed. In other words, in replacing the air filter 7, the auxiliary lid late, not shown, is released so that the air filter 7 needing replacement is withdrawn through the through hole 28, and thereafter a new replacement air filter 7 is inserted through the through hole 28. Thus, replacement work can easily be performed.

Furthermore, in repairing or replacing the evaporator 1, the insulator 11 is withdrawn from the cooling case 6 together with the air filter 7a and the evaporator 1, this facilitating repair or replacement work. Namely, in this case, screws, not shown, are removed from the respective screw holes 15, 15 and the through holes 16, 16, and then the lid 20 is removed to open the side opening 12. Following this, the insulator 11 is withdrawn from the cooling case 6 together with the air filter 7 and the evaporator 1. After the evaporator 1 is repaired, the respective members 11, 7, 1 are then installed back in the cooling case 6.

In the case of the illustrated embodiment, as described above, since the inclined projection 19 provided on the bottom of the insulator 11 is in engagement with the depression formed in the bottom of the cooling case 6, the whole of the insulator 11 cannot be withdrawn out of the cooling case 6 without the insulator 11 being broken. However, the insulator 11 formed from the expanded polystyrene fails quite easily when a great magnitude of force is applied thereto. Therefore, in repairing or replacing the evaporator 1, with an effort to withdraw the evaporator 1 from the side opening 12 after the lid 20 is removed, the insulator 11 breaking, the evaporator 1 can thus be withdrawn.

In addition, in assembling an automobile air conditioner at an assembly plant, an insulator 11 is placed on a lower half piece 10, and then an evaporator 1 is placed on the insulator 11, thereafter an upper half piece 9 being placed on the lower half piece 10. Thus, there is no difficulty in bringing an inclined projection 16 into engagement with a depression in the bottom of a cooling case 6.

Moreover, in installing the repaired (or a new) evaporator 1 and a new insulator 11 in the cooling case at a garage, the evaporator 1 is assembled to the insulator 11 within the cooling case 6. In other words, a repair insulator 11 comprises a rectangular box-like main body portion 21 for holding a lower end portion of the evaporator 1 and a separate inclined projection 19. Then, the inclined projection 19 is placed in the depression in the bottom of the cooling case 6 in advance, and the main body portion 21 on which the evaporator 1 is placed is pushed into the cooling case 6 from the side opening 12. In the event that an evaporator having the tanks situated at an upper end portion thereof is used, the positional relationship shown in the drawings is regarded as upside down.

Since it is constructed and operated as described above, the automobile air conditioner according to the present invention can facilitate the repair or replacement work of an evaporator, and moreover with the air conditioner, a small automobile air conditioner can be realized.

Although the invention has been described in its preferred form with a certain degree of particularity, it is understood that the present disclosure of the preferred form can be arrangement of parts without departing from the spirit and the scope of the invention as hereinafter claimed.

What is claimed is:

1. An automobile air conditioner comprising:

a blower unit provided at an upstream end of a flow of air for use in air-conditioning and sending the air to a downstream side of the air flow;

a cooling unit provided at a downstream side of said blower unit and having an air filter for trapping foreign matters in the air sent from said blower unit and an evaporator for cooling the air; and a heater unit provided at a downstream side of said of said cooling unit for heating the air sent from said cooling unit, wherein said cooling unit is accommodated in a cooling case, said cooling case comprising:

a main body for accommodating said air filter and said evaporator and having an opening formed in one side thereof;

a lid detachably mounted on said main body for closing said opening;

an insulator for holding said evaporator to be freely withdrawn from said opening together with said evaporator; and a guide portion provided on said insulator for guiding an edge portion of said air filter.

2. An automobile air conditioner according to claim 1, further comprising:

a through hole being formed in said lid at a portion confronting said air filter so that said air filter is allowed to freely pass through said through hole; and an auxiliary lid plate being provided for closing said through hole.

3. An automobile air conditioner according to claim 1, wherein an inclined projection is formed on a bottom of said insulator and a depression to be engaged with said inclined projection is formed on a bottom of said cooling case.

4. An automobile air conditioner according to claim 1, wherein a notched portion for disposing a feed pipe and a withdrawal pipe for said evaporator therein is formed in said insulator.

5. A cooling unit for an automobile air conditioner, said blower unit being disposed between a blower unit and a heater unit with respect to flow of air for use in air-conditioning, said cooling unit comprising:

an air filter for trapping foreign matters in the air sent from the blower unit;

an evaporator for cooling the air; and a cooling case for accommodating said air filter and said evaporator, said cooling case comprising:

a main body having an opening formed in one side thereof;

a lid detachably mounted on said main body for closing said opening;

an insulator for holding said evaporator to be freely withdrawn from said opening together with said evaporator; and a guide portion provided on said insulator for guiding an edge portion of said air filter.

6. A cooling unit according to claim 5, further comprising:

a through hole being formed in said lid at a portion confronting said air filter so that said air filter is allowed to freely pass through said through hole; and an auxiliary lid plate being provided for closing said through hole.

7. A cooling unit according to claim 5, wherein an inclined projection is formed on a bottom of said insulator and a depression to be engaged with said inclined projection is formed on a bottom of said cooling case.

8. A cooling unit according to claim 5, wherein a notched portion for disposing a feed pipe and a withdrawal pipe for said evaporator therein is formed in said insulator.

* * * * *